US008656154B1

(12) United States Patent
Kailash et al.

(10) Patent No.: US 8,656,154 B1
(45) Date of Patent: Feb. 18, 2014

(54) CLOUD BASED SERVICE LOGOUT USING CRYPTOGRAPHIC CHALLENGE RESPONSE

(75) Inventors: Kailash Kailash, San Jose, CA (US); Amarnath Mullick, Bangalore (IN)

(73) Assignee: Zscaler, Inc., San Jose, CA (US)

( * ) Notice: Subject to any disclaimer, the term of this patent is extended or adjusted under 35 U.S.C. 154(b) by 231 days.

(21) Appl. No.: 13/151,369

(22) Filed: Jun. 2, 2011

(51) Int. Cl.
*H04L 29/06* (2006.01)

(52) U.S. Cl.
USPC ........... 713/155; 713/159; 713/168; 713/171; 713/172; 726/1; 726/9; 726/16; 726/17; 726/20

(58) Field of Classification Search
USPC .......... 726/1, 2, 9, 16–20; 713/155, 159, 168, 713/171–172
See application file for complete search history.

(56) References Cited

U.S. PATENT DOCUMENTS

| | | | |
|---|---|---|---|
| 7,702,906 B1 * | 4/2010 | Karr et al. ..................... | 713/164 |
| 8,219,808 B2 * | 7/2012 | Belohoubek et al. ......... | 713/168 |
| 2004/0139028 A1 * | 7/2004 | Fishman et al. ............... | 705/67 |
| 2007/0094503 A1 * | 4/2007 | Ramakrishna ................. | 713/172 |
| 2008/0072301 A1 * | 3/2008 | Chia et al. ..................... | 726/8 |
| 2008/0184355 A1 * | 7/2008 | Walrath et al. ................. | 726/9 |
| 2009/0138951 A1 * | 5/2009 | Birk et al. ...................... | 726/7 |
| 2009/0165105 A1 * | 6/2009 | Chaudhry ....................... | 726/7 |
| 2012/0023567 A1 * | 1/2012 | Hammad ........................ | 726/9 |
| 2012/0084837 A1 * | 4/2012 | Dhanakshirur ................. | 726/4 |
| 2012/0204032 A1 * | 8/2012 | Wilkins et al. ................ | 713/170 |

* cited by examiner

*Primary Examiner* — Jeffrey Pwu
*Assistant Examiner* — Jayesh Jhaveri
(74) *Attorney, Agent, or Firm* — Clements Bernard PLLC; Lawrence A. Baratta, Jr.; Christopher L. Bernard

(57) ABSTRACT

A cloud based service use may be logged into the service through multiple client devices simultaneously. Methods, systems, and computer program products base upon cryptographic challenge response are provide to efficiently and securely simultaneously effect a logout from the cloud based service at one or many logged-in client devices associated with the user. When a valid logout request is received by the cloud based service, a current key associated with the user is invalidated, and in some instances, replaced with a new key. Upon subsequent attempt to use the cloud based service by the user, one or more tokens residing on any previously logged-in client device associated the user will not allow cloud based service usage until the user validly logs into the cloud-based service and receives one or more new tokens based upon the new key at each client device.

17 Claims, 2 Drawing Sheets

CLOUD BASED SERVICE LOGOUT USING CRYPTOGRAPHIC CHALLENGE RESPONSE

I. BACKGROUND

The present invention relates to computerized systems, software and methods for administratively or voluntarily logging out a validly logged-in cloud based service user. Logging out users of a cloud based service presents a challenge for a number of reasons.

First, shared service accounts arise in a variety of ways. Hotels, Coffee Shops, internet cafes, internet kiosks, etc provide internet access to its customers. The customer's internet access is short-lived, lasting from a couple of minutes to a couple of days. Shared accesses also occur in enterprises where partners, vendors, contract workers, students, share service accounts in a time multiplexed manner. In all these scenarios, though the number of concurrent users is small, the number of unique visitors over a period of time is significantly large. Such shared service usage occurs in retail shops, conference venues, exhibition halls, etc. An efficient and secure logout operation facilitates provision of safe and confidential internet access through shared service accounts.

Next, a secure logout can prevent usage of the accounts using stolen laptops and other computing devices which may have the logged-in tokens. As used herein, logged-in tokens are tokens that encode the logged-in state in some form and facilitate the cloud based service without further authentication.

In addition, stolen or compromised login credentials can lead to multiple service logins from multiple locations and can be prevented using a logout operation coupled with change of user name and password. The forgoing discusses why a simple change of password is not sufficient.

Finally, a secure logout operation can provide a cloud service provider to instantaneously administratively suspend user services at any time such as due to non-payment of the services rendered or compromised credentials. User services may be re-established after such a problem is cleared.

For at least the above reasons, a logout operation that prevents the use of account beyond a defined period is useful. Such a period may be administratively decided or user mandated.

One known method to implement logout operation is to maintain the logged-in state in a centralized service node. The state can be changed by a logout operation. However every user access needs to check the login state. For cloud based services, the user population is so large that the centralized services could easily be overwhelmed by the login state checks. Moreover, when the centralized node fails, authenticated users are unable to proceed.

Another method used by the popular instant messaging systems is that of notifying the service nodes about the user presence. Instead of checking the logged-in status every time, any change in status is communicated to the service nodes. Though this approach reduces the communication overhead to a greater extent, any link failures between the centralized node and the service node would make the system unable to logout users.

A third known method used by cloud based services stores the logged-in information in the client computing device itself, notably in the form of cookies. The logged-in state is then cleared by clearing the cookies. Though this is a scalable alternative, it suffers from the following defects.

Users may forget to clear the cookies and it would become an administrative overhead.

Administrator might want to perform logout, but users may have done the login in multiple systems.

When a group of user's need to be administratively logged-out, even users at remote locations, the mechanism of clearing the cookies does not work.

Stolen or lost computers may have cookies; an administrative logout cannot be performed.

Selective clearing of cookies is time consuming as there will be cookies related to the login state as well as cookies related to other state management. Collective clearing would invalidate other application states.

Two existing approaches to logout user sessions from a cloud based service using the cookie approach are through (i) automatic expiration of cookies and (ii) through explicit flushing of cookies through a logout program or through user's action of clearing cookies of all kinds. However, the cookie expiration is not communicated to the system, and the system can still accept the same cookies. Hence, the tokens may be used to login to the service. A modified approach is to maintain session on the server and clear the session when the cookies are expired. Computing the expiration time in relation to user's intended usage time becomes difficult, if not infeasible.

II. SUMMARY

The present application discloses a set of technology for logging out users from a cloud based service. Methods, systems, and computer program products are discussed that provide for logging out users of a cloud based service who may be validly logged into the service through one or more client devices.

Cloud services are provided to a user who has a valid login token on a particular device. The login token can be delivered to the cloud service by any appropriate protocol; however, preferably a cookie mechanism is employed. The login token received from the device is compared to a valid login token for that user generated by a cloud service computer. The cloud service provides services if the received token matches the generated valid login token. The login tokens are cryptographically generated by a cloud service computer or other authorized source.

Generally, a user is logged out of the service when the token generated at the cloud service is inconsistent with the login token previously stored on the particular device. Therefore, logout is effected by receiving a logout request for a particular user and replacing the cryptographic key used to generate previously valid login tokens with a new key. In this way, subsequently generated valid login tokens will be inconsistent with login tokens previously stored on particular devices prior to the logout.

The foregoing general description and the following detailed description are exemplary and explanatory only and do not restrict the claims directed to the invention. The accompanying drawings, which are incorporated in and constitute a part of this specification, illustrate one or more embodiments of the invention and together with the description, serve to explain the principles of the disclosed technology.

III. BRIEF DESCRIPTION OF THE DRAWINGS

IV. DETAILED DESCRIPTION

This application refers in detail below to the exemplary embodiments of cloud-service logout systems, methods and software, which are illustrated in the accompanying drawings. Wherever possible, the application uses the same reference numbers throughout the drawings to refer to the same or similar items.

Cloud based security (for example ZScaler Cloud™) is an emerging framework to deploy and upgrade security solutions for multiple service subscribers without causing the upgrade delay found in conventional premise security appliances and applications. Cloud based security is the common core of any cloud based service offering. Security services such as URL and content based message filtering, Malware Scanning, Data Leakage Protection, may be performed by the use of an access gateway. Additional specific services may be offered through appropriate configuration of policies available in the gateway.

Since cloud-based services can scale on user demand, it can facilitate managing and providing security to guest accounts. Guest accounts are re-usable accounts, and the user of the account changes with time. Proper initiation and termination of the guest usage is a requirement. Discussed herein are approaches to logout users from a cloud-based service; such approaches may be particularly apt for use with guest accounts that are subject to reuse with different users using the same account at different times.

Figure 1:
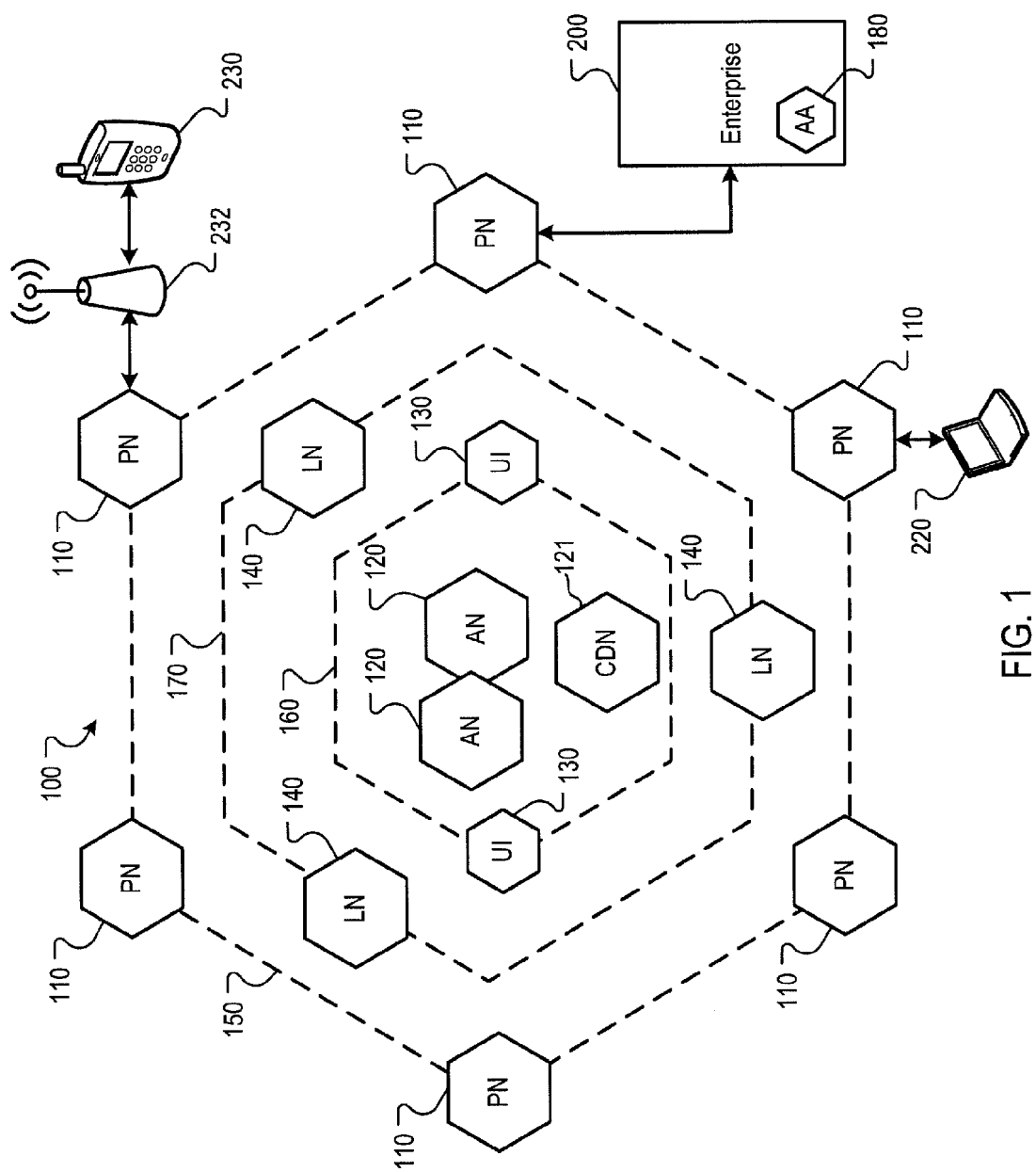
FIG. 1 is a block diagram of a cloud security system.
Figure 2:
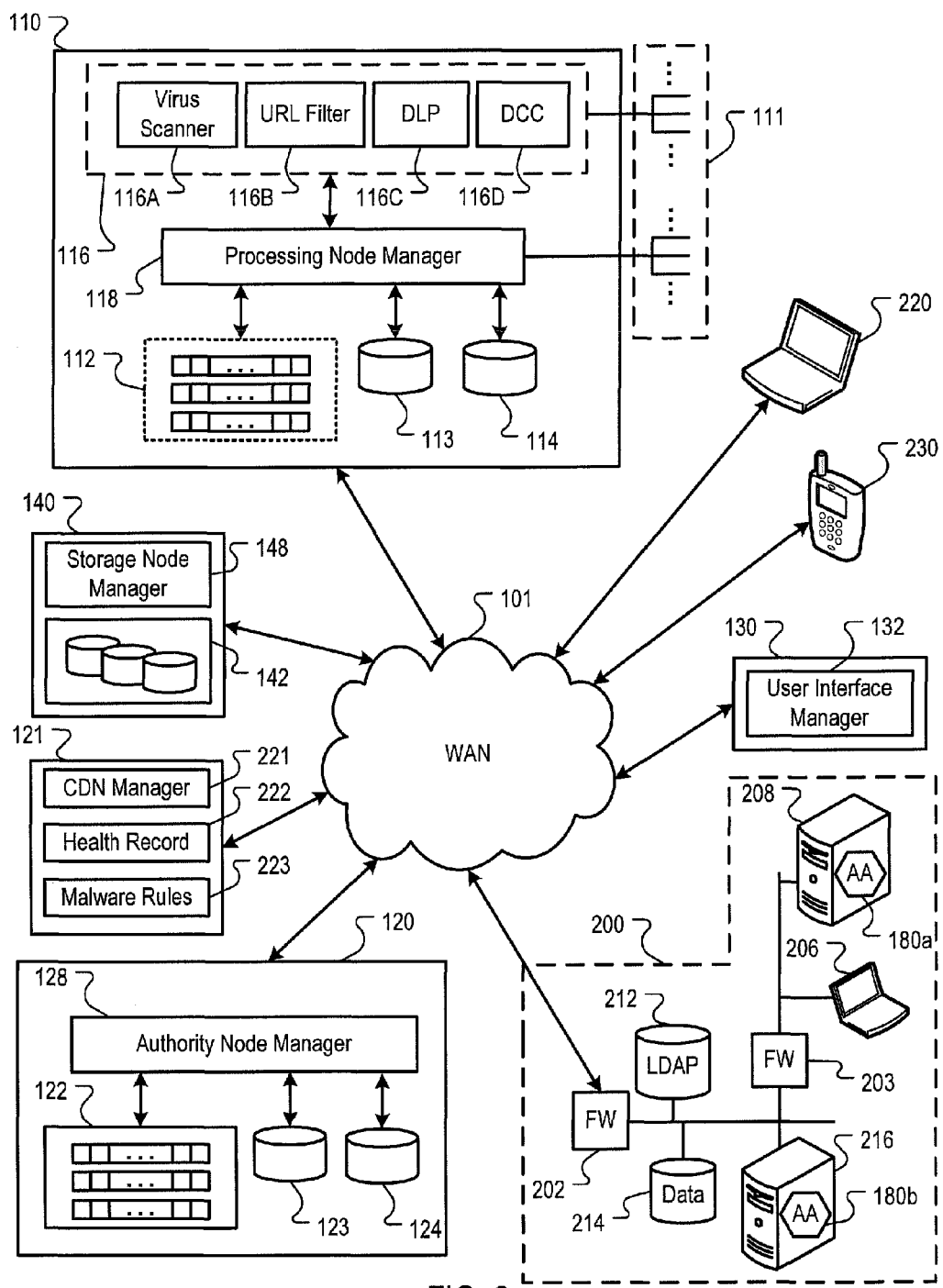
FIG. 2 is a block diagram of the system of FIG. 1 in which the components of FIG. 1 are illustrated in more detail.

FIG. 1 is a block diagram of a cloud based security system 100. The system 100 can, for example, be implemented as an overlay network in a wide area network (WAN), such as the Internet. The system 100 includes content processing nodes 110 that detect and preclude the distribution of security and performance threats, e.g., malware, sent from or requested by an external system. Example external systems can include an enterprise 200, a computer device 220, and a mobile device 230, or other network and computing systems.

The term malware is used throughout the present disclosure to include any undesirable content that can pose a security risk or negatively impact the performance of a computing device, including, for instance, viruses, spyware, and spam.

1.0 Example High Level System Architecture

In an example implementation, each processing node 110 can include a decision system, e.g., data inspection engines that operate on a content item, e.g., a web page, a file, an e-mail message, or some other data or data communication that is sent from or requested by one of the external systems. In some implementations, all data destined for or received from the Internet is processed through a processing node 110. In other implementations, specific data specified by each external system, e.g., only e-mail, only executable files, etc., is process through a processing node 110.

Each processing node 110 can generate a decision vector $D=[d_1, d_2, \ldots, d_n]$ for a content item of one or more parts $C=[c_1, c_2, \ldots, c_m]$. Each decision vector can identify a threat classification, e.g., clean, spyware, malware, undesirable content, innocuous, unknown, etc. For example, the output of each element of the decision vector D can be based on the output of one or more data inspection engines. In some implementations, the threat classification can be reduced to a subset of categories e.g., violating, non-violating, neutral, unknown. Based on the subset classification, a processing node 110 may allow distribution of the content item, preclude distribution of the content item, allow distribution of the content item after a cleaning process, or perform threat detection on the content item.

In some implementations, the actions taken by a processing node 110 can be determinative on the threat classification of the content item and on a security policy of the external system to which the content item is being sent from or from which the content item is being requested by. A content item is violating if, for any part $C=[c_1, c_2, \ldots, c_m]$ of the content item, at any processing node 110, any one of the data inspection engines generates an output that results in a classification of "violating."

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communication to a nearest processing node 110 through any available wireless access device, such as an access point, or a cellular gateway. A single computer device 220, such as a consumer's personal computer, may have its browser and e-mail program configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store policy data for each external system and can distribute the policy data to each processing node 110. The policy data can, for example, define security policies for a protected system, e.g., security policies for the enterprise 200. Example policy data can define access privileges for users, web sites and/or content that is disallowed, restricted domains, etc. The authority nodes 120 can distribute the policy data to the processing nodes 110.

In some implementations, the authority nodes 120 can also distribute threat data that includes the classifications of content items according to threat classifications, e.g., a list of known viruses, a list of known malware sites, spam e-mail domains, etc. The distribution of threat data between the processing nodes 110 and the authority nodes 120 can implemented by push and pull distribution schemes described in more detail below.

In some implementations, each authority node 120 can be implemented by a plurality of computer and communication devices, e.g., server computers, gateways, switches, etc. In some implementations, the authority nodes 110 can serve as an application layer 160. The application layer 160 can, for example, manage and provide policy data, threat data, and data inspection engines and dictionaries for the processing nodes.

The system 100 also includes a configuration distribution node (CDN) 121 that coordinates each of the processing nodes 110 and storage nodes 140. The CDN 121 can perform all of the functions of an authority node 120. According to some implementations, the CDN 121 can be an authority node 120. Thus, although illustrated as a separate component from the authority nodes 120, the CDN 121 may represent one such authority node 120. The CDN 121 can act as a master authority node by receiving data corresponding to system activity from each of the processing nodes 110 and storage nodes 140, which are each operable to forward the data to the CDN 121.

In some implementations thousands of system activities can be monitored at predefined intervals within each of the systems monitored by the processing nodes 110 and storage nodes 140. Data corresponding to at least some of the system activity is communicated from the processing nodes 110 and storage nodes 140 to the CDN 121. For instance, data corresponding to a few hundred system activities can be routinely communicated to the CDN. System activities can include operating system activity (e.g., disk I/O, File I/O, System Call), network events (e.g., packets received, packets sent, retransmissions, errors), and/or content inspection events (e.g., operation of anti-virus software, the occurrence or results of content inspection).

As described in greater detail below, the CDN 121 receives data corresponding to system activity from multiple networks during normal operation of the networks. The CDN 121 thus allows collection and monitoring of data from multiple, aggregated networks over a wide geographical distance. That data is stored and accessible by the CDN 121 for comparison to data collected corresponding to subsequent system activity. When the subsequent data falls outside of parameters based on the data representing normal operation of the networks, the CDN 121 can generate an alert.

An alert can be to an administrator associated with the system 100 or one or more of the networks, and can be an e-mail, instant message, or the like. An alert can also include corrective action to prevent activity that is causing generation of the data that does not represent the normal operation of the monitored networks.

Other application layer functions within the system 100 can be provided in the application layer, such as a user interface front-end 130, also referred to herein as view node. The user interface front-end 130 provides a user interface through which users of the external systems can provide and define security policies, e.g., whether e-mail traffic is to be monitored, whether certain web sites are to be precluded, etc.

Another application capability that can be provided through the user interface front-end 130 is security analysis and log reporting. The underlying data on which the security analysis and log reporting functions operate are stored in storage nodes 140, which serve as a data storage layer 170. Each storage node 140 can store data related to security operations and network traffic processed by the processing nodes 110 for each external system.

In some implementations, the storage node 140 data can be anonymized so that data identifying an enterprise is removed or obfuscated. For example, identifying data can be removed to provide an overall system summary of security processing for all enterprises and users without revealing the identity of any one account. In another example, identifying data can be obfuscated, e.g., provide a random account number each time it is accessed, so that an overall system summary of security processing for all enterprises and users can be broken out by accounts without revealing the identity of any one account. In other implementations, the identifying data and/or storage node 140 data can be further encrypted, e.g., so that only the enterprise (or user if a single user account) can have access to the storage node 140 data for its account. Other processes of anonymizing, obfuscating, or securing storage node 140 data can also be used.

In some implementations, an access agent 180 can be included in the external systems. For example, an access agent 180 is deployed in the enterprise 200. The access agent 180 can, for example, facilitate security processing by providing a hash index of files on a client device to a processing node 110, or can facilitate authentication functions with a processing node 110, e.g., by assigning tokens for passwords and sending only the tokens to a processing node so that transmission of passwords beyond the network edge of the enterprise is minimized. Other functions and processes can also be facilitated by an access agent 180.

In some implementations, the processing node 110 may act as a forward proxy that receives user requests to external servers addressed directly to the processing node 110. In other implementations, the processing node 110 may access user requests that are passed through processing node 110 in the transparent mode. A protected system, e.g., enterprise 200, can, for example, chose one or both of these modes.

For example, a browser may be configured either manually or through an access agent 180 to access a processing node 110 in a forward proxy mode. In the forward proxy mode, all accesses are addressed to processing node 110.

In another example, an enterprise gateway can be configured so that user requests are routed through the processing node 110 by establishing a communication tunnel between enterprise gateway and the processing node. For establishing the tunnel, existing protocols such as generic routing encapsulation (GRE), layer two tunneling protocol (L2TP), or IP security protocols may be used.

In another example, the processing nodes 110 can be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected. For example, at the within the enterprise an access agent 180 can be configured to perform MPLS labeling.

In another transparent proxy mode example, a protected system, such as the enterprise 200, may identify a processing node 110 as a next hop router for communication with the external servers.

2.3 Example CDN Architecture

The CDN 121 coordinates each of the processing nodes 110, and storage nodes 140. As described above, according to an implementation, the CDN 121 can represent an authority node 120. Thus, the CDN 121 can perform all of the functions of an authority node 120 and can receive data corresponding to system activity from each of the processing nodes 110 and storage nodes 140.

The CDN 121 includes a CDN manager 221 for managing the operations of the CDN. Because the CDN 121 can represent an authority node 120, in some implementations the CDN manager 221 may be implemented or be the same as the authority node manager 128. The CDN manager 221 can facilitate the collection and/or receipt of data corresponding to system activities from each of the processing nodes 110, storage nodes 140, and authority nodes 120. The data can be stored in a heath record 222. In implementations where the CDN 121 is an authority node, the health record 222 can exist within the authority node 120. According to some implementations, the CDN manager 221 can store data representing changes in system state within the health record 222. The health record 222 can, for instance, be implemented via one or more tables.

According to some implementations, the CDN manager 221 can collect data (e.g., sample data) during a sampling interval in which the network is operating under normal conditions. The sample data can be collected at sampling intervals that capture small changes in the network, such as at 1-10 samples per second for each system activity occurring at each node in the system. The sample data can be stored in the health record 222. According to some implementations the CDN manager can 221 use the sample data to generate and store one or more threshold values that indicate the range of possible activities that are considered normal.

For instance, for a particular system activity the CDN manager 221 can identify maximum or minimum threshold values from the sample data, where the threshold values representing the range of acceptable values for the system to be considered operating normally. Threshold values can be stored for each type of activity such that collection of subsequent data during system monitoring can be compared against the values by the CDN manager 221 to determine if the system is operating normally.

After the sampling interval is complete, the CDN manager 221 can collect data (e.g., observed data) to monitor the health of the network and to identify when malicious activity may be taking place. The observed data can be collected at intervals that capture small changes in the network, such as at 1-10 samples per second for each system activity occurring at each node in the system. In some implementations the observed data can be stored in the health record 222.

The CDN 221 determines if the observed data represents the normal operation of the monitored networks based on malware rules 223 that instructs the CDN manager 221 on whether the observed data indicates that the network is operating within a normal range based on the sample data. In implementations where the CDN 121 is an authority node 120, the malware rules 223 can exist within the authority node 120. As an example, the malware rules 223 may indicate that the system is operating normally when the observed data falls within a certain range or percentage of an average of sample data for a particular system activity. For instance, if during a sample interval of 10 seconds there are 10 web-site redirections, and during a subsequent observed interval of 10 seconds there are 11 web-site redirections, then the malware rules 223 may indicate that the system is operating under normal conditions. On the other hand, during a subsequent observed interval of 10 seconds there are 20 web-site redirections, then the malware rules 223 may indicate that malicious activity has been detected. Thus, the CDN manager 221 can determine if the observed data represents the normal operation of the monitored networks by comparing the observed data to sample data using one or more malware rules. According to some implementations, the malware rules can identify one or more threshold values representing one or more acceptable values, ranges, or percentages of sample data during the normal operation of the plurality of monitored networks.

According to some implementations, the CDN manager 221 will update the health record 222 only with changes in observed data. For instance, if many system activities do not change during system monitoring, data for those activities are not constantly updated by the CDN manager 221. By updating only changed data the CDN manager 221 minimizes the processing and read/write activities required to maintain the health record 222 and monitor the system 100.

According to some implementations the nodes will not transmit observed data to the CDN 121 when the data is unchanged from a previous interval, or changed by a minimum amount. The CDN 121 can be configured to transmit rules to the nodes instructing each when minimal or no observed data needs to be transmitted to the CDN 121, thus reducing the amount of network traffic required to identify malicious activity. For instance, the CDN 121 can instruct storage nodes not to report observed data for each system activity where the data is within 5% of the previous value of such system activity.

Using the health records 222 and malware rules 223, the CDN manger 221 can detect the status of each node in the system (e.g., live, congested, idle, busy), malicious code outbreaks by observing changes in system activity data (e.g., the number of viruses detected are higher than normal), and virus flow detection. When the observed data indicates that the networks are not operating normally (i.e., within a normal operating range as provided by the sampling data), the CDN 121 can generate an alert. An alert can be communicated to an administrator associated with the system 100 or one or more of the networks, and can be an e-mail, instant message, or the like. An alert can also include corrective action to prevent activity that is causing generation of the data that does not represent the normal operation of the monitored networks.

3.0 Global System Monitoring

As described above, the distributed system of processing nodes, storage nodes, and authorizing nodes can be coordinated through a CDN 121. The CDN 121 monitors system health at system, region and geographic levels. After sampling data is collected for a large number of system activities across networks, observed data is collected for some or all of those system activities at fine intervals of time. Using the observed data the CDN detects abnormalities in the system, such as virus and spam outbreaks and targeted attack patterns.

A large number of system activities (e.g., in the thousands) can be tracked and monitored at a predefined interval in each of the nodes and their corresponding networks. Data corresponding to a subset (e.g., a few hundred) of these activities are communicated to the CDN 121 for use in monitoring the health of the nodes and identifying the outbreak of virus, spam and other undesirable network traffic in networks connected to the nodes.

3.0.1 Identifying Abnormal System Activities

Abnormalities in the system are identified by the CDN manager 221 due to a sudden increase in certain system activities, such as an increase in the detection of malware, viruses, spam, bad content, and the like. These malware activities are indicated by a number of system activities collected in the observed data by the CDN 121.

A first system activity are redirects identified within processing nodes at regional, country, and global levels. Observed data can include the number of such redirects. Malware infection can be detected by monitoring the redirection of request to new locations. Although there may be legitimate redirects, the CDN 121 is configured to identify deviation from a 'normal' number of redirects for a certain predefined number of web transactions collected during a sampling interval. Such as deviation can indicate malicious activity and abnormal operation of one or more networks where the redirections occur. For instance, the malware rules 223 within the CDN 121 may indicate that a 25% increase in redirects over a particular time period is indicative of a malware infection (i.e., malware activity).

Another system activity is a policy violation. Observed data can include the number of policy violations occurring within a network. For instance, a policy violation can occur when an employee is accessing a web site that the employee is not supposed to visit due to his or her company's policies.

Typically, the number of such policy violations is marginal and consistent. Sudden changes in the number of policy violations can be used as an indicator of malicious activity and can be identified by the CDN 121 through collection of observed data and comparison to the 'normal' number of policy violations during a sampling interval taken during normal operation of the system. The comparison can be executed using malware rules 223 that indicates whether a change in volume provided by a comparison of the observed data and sample data is indicative of a malware infection.

Yet another system activity that can be monitored by the CDN 121 is the operation of malware. Observed data can include the volume of malware detected at each node. According to some implementations, malware can be detected at each node by a virus scan. The CDN 121 can identify sudden increases in malware by comparing the observed volume of malware with sample volume of malware for a same time interval during normal operation of the system. As discussed above, whether an increase in the volume of malware is deemed a malware infection is based on malware rules 223. In some implementations, observed data can also include the direction of malware (upload vs. download) that is detected. The CDN 121 can identify spikes in uploading or downloading of malware. The variation of volume of malware detected in the outbound traffic in proportion to the inbound traffic can also be monitored. For instance, the CDN 121 can identify a malware infection when a sudden increase in outbound traffic occurs with respect to inbound traffic, which could be based on a the attack of many hosts from a single infected host.

Another system activity is the serving of error pages. Observed data including the number of error pages returned may be tracked to identify potential malicious activity. For instance, a spike in the number of observed error pages as compared to the expected number of error pages may be presumed to be the result of malicious activity.

Yet another system activity is the serving of web pages having a particular category. For instance, observed data can include the number of web pages served or accessed having a particular classification, such as 'infected'. A sudden increase in the number of infected web pages served, for instance, may result in the CDN 121 identifying malicious activity. Additionally, sudden changes in the category of sites (detected by the content inspection engines) reported may be indicative of malicious activity.

Observed data for web pages may also include web page classifications based on URL and based on web page content. The malware rules 223 may be configured to deem that an inconsistency in these classifications may be indicative of suspicious activity, and malware rules 223 can indicate that a particular volume of such inconsistencies is indicative of malware activity. Yet additional observed web page related data is a change in the category of top 'N' sites over any period of time. Because malicious activities can 'phone-home' and connect to similar servers, sudden activity resulting in unknown or malware categories of URLs falling within the top 'N' accessed and/or requested sites may be deemed to indicate a malware outbreak. Thus, the identification of possible malware activity may be based on detecting web site abnormalities over time, and/or on the abnormality of website requests over time. Both types of abnormalities are captured by the CDN 121.

3.0.2 Variations in Observations of Abnormalities

As described above, the CDN 121 uses malware rules 223 to identify if one or more networks within the system are subject to malicious activity. Because malicious activity leads to abnormal statistical records, the malware rules can identify possible malicious activity through a comparison of statistical and observed data. Although described above with respect to example system activities where observed data for a single system activity can result in the presumption of malicious activity, the malware rules 223 may require a cumulative number of instances, over a period of time, in which observed data vary from an expected range, percentage, average, mean (or the like) from sample data.

According to some implementations, abnormalities in observed data identified by the malware rules 223 are counted and tracked as a time series. Three types of abnormalities may be indicative of a malware outbreak. First, a mild increase in a statistical activity followed by a sporadic increase in another statistical activity after a period of time may be indicative of malicious activity. Secondly, multiple sets of abnormal activities spaced in time may indicate malicious activity. An example of this kind occurs when malicious activity is prevented by the security policies which block malicious content. A third type of outbreak pattern occurs when there is a single, sudden peak in a particular activity. This can occur, for instance, where security policies of a company are not strong enough to protect against an attack. When malware is propagated by a chain of activities such as a visit to an infected site, this could cause a malicious program such as a back-door or Trojan to be downloaded which in turn downloads other malicious code which then causes other infected sites to be visited. This pattern could produce progressively increasing peaks in observed data for a particular system activity.

The malware rules 223 can be configured, for instance, by a system administrator, to account for each of the above abnormalities that are based on the receipt of observed data at the CDN 121. As an illustrative example, if malware is detected more than 'X' number of times, such as 50, then an alert can be generated.

3.0.3 Generation of Alerts

When the observed data falls outside of parameters established by the malware rules 223, the CDN 121 can generate an alert. An alert can be to an administrator associated with the system 100 or one or more of the networks, and can be an e-mail, instant message, or the like. An alert can also include corrective action to prevent activity that is causing generation of the data that does not represent the normal operation of the monitored networks.

4.0 Example Processes of User Logout

In some implementations, the user initially logs in through the processing node 110 which may use access agent 180 to validate the user. The access agent validates the user through the authority node 120. The authority node 120 provides access agent 180 with information to find the type of validation (Eg. LDAP, Active Directory, Hosted credential database, etc) and prompts the user for required validation credentials such as user name, password, designate client certificate etc. Once the user is validated a validation token is issued to the user. Validation token may consists of a relatively persistent token that indicates that the user is eligible to receive updated validation tokens for the domains it visits and also issues a short lived volatile token that is valid for a particular domain. The domain tokens are periodically updated. Validity of the domain token can be independently computed by the processing node 110 and does not involve checks to authority node 120 or access agent 180.

In order to describe the logout mechanism, the logged-in state is defined. A user is in a logged-in state if it can answer a challenge from processing node 110 and the challenge is made in such a way that it can be answered only by a logged in user's user agent For example, the challenge may be that "encode and provide your user identity and the name of the domain being accessed", using the cryptographic keys and algorithms known only to the service providing node, processing node 110. It can only be done if the user agent already has the token encoded with the key of the processing node 110 and the secret algorithm used by processing node 110. Another challenge may be to encode the domain name of the authority node 120 and the identity of the user.

The service node, processing node 110, has to simply verify the decoded domain name with the domain name present in the request and then infer that the user identity is the identity of the logged-in user. This form of state maintenance wherein the state is maintained through the challenge is very scalable. This also provides an easy mechanism to render the states invalid. For example, by changing the cryptographic key or the algorithm used to encode the domain name and user identity.

Irrespective of the modality for login, the result of the process is that the user receives an encrypted token on the client device. The encryption uses a secret key (non Shared, Non-Public) to encrypt. The association of the encryption key to the user is maintained at the processing node 110. Given a user identity, the key can be retrieved based upon the association, for example, by a table lookup or through an encoded function.

The logout feature makes the tokens that are held by the user against a domain invalid. The tokens become invalid when the secret key used to encode the tokens is changed. Authority node 120 periodically updates processing node 110 with a set of keys, for example 4K of keys. When a user logs-in using credentials, an association of the user identity with the keys is made by authority node 120 and communicated to processing node 110. The association may be a many-to-one association such that many users may be sharing a key at the same time. The keys can form a global store and key association can be made per user with limited memory footprint. Key association of the specific user is changed when a logout operation is performed. Only the association of the user which did the logout is changed, other associations remain intact Even though two users may share same key, their validation token are not same because they encode different user identities and domains. Since encryption is based on cryptographic algorithms, by knowing the encoded token and the source data, the key cannot be computed. Hence only a logged-in user can provide the tokens.

Let Encode denote the cryptographic operation used to generate the token.

$$T_{i,j,k}=\text{Encode}(K_i, D_j, U_k)$$

where token $T_{i,j,k}$ for user with identity $U_k$ is created for domain using the key $K_i$. The present key association is $<U_k, K_i>$ for user $U_k$ In a preferred implementation, tokens are stored as cookies on the client device. As such, they are not interpreted by the client. Instead they are simply relayed back to the processing node 110. Both token producer and token consumer are the same, in this case, processing node 110. Due to this property, either a symmetric key or an asymmetric key can be used by the mechanism. Consequently, $K_i$ may denote an asymmetric key pair as well as a symmetric key without loss of generality. The client is simply a custodian of the tokens, relaying the tokens while accessing the domains.

Login is a process that binds $<U_k, K_i>$. Logout is a process where the association is modified to $<U_k, K_d>$ where d an offset to the list or table of keys to obtain a new key. The value of d is preferably randomly chosen. The new association is updated in authority node 120 so that any processing node 110 can obtain the new association. A user which holds a token that has been encrypted by a key $K_i$ will not be able to access the service without entering the login credentials again.

In order to choose the key to decode a token, several methods may be used. In one method, all users are allocated the same key and at most two keys may be used; the current key and the previous key. In another method all users originating from the same organization are given the same key. In such a case, the token may include an encrypted portion designating the organization, where that portion is encrypted using a key known to the processing node. Such a key may be changed at random interval to ensure security; however, in such an implementation, all users from the particular organization would be effectively logged out upon key change and would need to re-authenticate with the cloud service using credentials. Once the organization is identified, the correct organization key can be selected for use with the token.

In another method, the user identity is encrypted using a different key (K) and provided as an additional cookie that can be presented along with the login-state token as discussed in greater detail below. Alternatively, the two tokens can be included within different portions of the same cookie.

There are two challenge response tokens $T_{i,j,k}$ and $t_k$ where $t_k=\text{encode}(K, U_k)$. When a challenge response is presented, $u_k=\text{decode}(K, t_k)$
$K_i=\text{KeyLookup}(u_k)$
$D_j, U_k>=\text{Decode}(K_i, T_{i,j,k})$
If ($D_j==$Request.Domain && $U_k==u_k$) then logged-in-valid A logout operation changes $<U_k, K_i>$ to $<U_k, K_d>$ so that the following operations results.

$u_k=\text{decode}(K, t_k)$
$K_d=\text{KeyLookup}(u_k)$
$<D_p, U_q>=\text{Decode}(K_d, T_{i,j,k})$
$D_p \neq D_j$
$U_q \neq U_k$ The decoded values of domain and user identity will not match which results in processing node 110 inferring the logged-out state of the user. Since only $<U_k, K_i>$ is affected by this operation, only the intended user is logged out.

The associations between a user and a key may be managed in a variety of ways. For instance, in one implementation, the authority node 120 may maintain a table of keys and a table of users. The entry for each user in the user table may include an index of the currently associated key in the key table. For users actively using one or more processing nodes 110, this information may reside locally at the used processing nodes 110 in addition to at the authority node 120. In such an implementation, upon logout, a new key association can be made through by changing the index associated with the user by a random offset in the key table. Alternatively, associated with the user could be an index generation method which changes upon logout. The generation method may use any combination of know information regarding the user to generate a particular key index. For instance, summing the ascii values of the letters in the user's name and performing a modulo operation based upon the key table size. Other examples include aggregating bit patterns in user information in different ways (e.g., every third bit in the user's identifier) into an index value within the key table size. Other mechanisms will be apparent to those skilled in the art. In yet another potential implementation, key association management may use an user identifier as a seed in a hash function to generate an appropriate index.

This approach to handling cloud-based service logout may facilitate management of guest accounts which may last a short interval of time. In such usage, logout actions may automatically performed when (i) user name is reset (ii) user password is reset (iii) a user credential is detached from the account. In addition the guest user or the administrator on behalf of the guest user can perform log out. In some implementations, an episode (for example 30 minute elapsed) number may be used as a salt so that the cookies look different to the user even when the same key, same domain and same user identity is used to encode and generate a cookie.

If users logout and login repeatedly, the key assignment can get circulated back to a previously used key. Some implementations may further maintain a pervious key association and current key association and effect logout by changing both key associations of the user.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a non-transitory computer readable medium. The computer readable medium can be a machine readable storage device, a machine readable storage substrate, a memory device (volatile or non volatile), or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of volatile or non volatile memory, media and memory devices, including by way of example semiconductor memory devices, e.g., EPROM, EEPROM, RAM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. Other embodiments of the invention will be apparent to those skilled in the art from their consideration of the specification and practice of the invention disclosed in this document. The applicant intends that the specification and examples be considered as exemplary only, with the true scope and spirit of the invention being indicated by the following claims.

What is claimed is:

1. A method of logging out a user from an authority service node within a cloud services environment, the method comprising the steps of:
    A) providing one or more cloud services to a particular user who is logged into the cloud services environment through a processing node communicatively coupled to the authority service node, wherein providing the one or more cloud services comprises verifying a logged in state of the user, wherein verifying the logged in state of the user comprises comparing (1) a first token received in connection with a request from the user for a cloud service from a requested domain with (2) a second token generated using a cryptographic key and the requested domain;
    B) receiving a logout request for the particular user; and
    C) replacing the cryptographic key associated with the particular user at the processing node with a second cryptographic key responsive to the logout request, wherein the second cryptographic key prevents the processing node from properly comparing the first token with the second token thereby preventing access by the processing node.

2. The method of claim 1, and further comprising the step of selecting the second cryptographic key from a set of cryptographic keys.

3. The method of claim 1, and further comprising the step of storing a record detailing the prior association of the particular user with the cryptographic key.

4. The method of claim 3, wherein the second cryptographic key is not identified in the stored record.

5. The method of claim 1, wherein the logout request comprises a user identifier token for the particular user, and further comprising the steps of decrypting the user identifier token for the particular user to generate a user identifier, and wherein disassociating the cryptographic key from the particular user comprising locating an association between the particular user and the cryptographic key based upon the user identifier.

6. A system, comprising:
    a cloud-based system comprising at least one processing node communicatively coupled to at least one authority node via a network;
    a user communicatively coupled to the at least one processing node; and
    a cryptographic challenge response mechanism between the user and the at least one processing node, the cryptographic challenge response mechanism configured to:
    A) provide one or more cloud services to the user who is logged into the cloud services environment through the at least one processing node communicatively coupled to the authority node, wherein providing the one or more cloud services comprises verifying a logged in state of the user, wherein verifying the logged in state of the user comprises comparing (1) a first token received in connection with a request from the user for a cloud service from a requested domain with (2) a second token generated using a cryptographic key and the requested domain;
    B) receive a logout request for the user; and
    C) replace the cryptographic key associated with the user at the processing node with a second cryptographic key responsive to the logout request, wherein the second cryptographic key prevents the processing node from properly comparing the first token with the second token thereby preventing access by the processing node.

7. The system of claim 6, wherein the cryptographic challenge response mechanism comprises verifying a logged in state of the user by comparing (1) a first token received in connection with a request from the user for a cloud service from a requested domain with (2) a second token generated using a cryptographic key and the requested domain.

8. The system of claim 7, wherein upon receiving a logout request from the user, the cryptographic key associated with the user is replaced with a second cryptographic key.

9. The system of claim 8, wherein the second cryptographic key is selected from a set of cryptographic keys.

10. The system of claim 8, wherein the at least one node is configured to store a record detailing the prior association of the user with the cryptographic key.

11. The system of claim 10, wherein the second cryptographic key is not identified in the stored record.

12. The method of claim 1, further comprising:
    communicating between the particular user and the processing node;
    logging into the cloud services environment through the processing node in communication with the authority service node;
    verifying the logged in state of the particular user at the processing node; and
    providing access to the requested domain based on the logged in state by the processing node.

13. The method of claim 1, wherein the processing node is configured to monitor all traffic between the particular user and the requested domain via a tunnel, a transparent proxy, a forward proxy, or redirection to the processing node.

14. The method of claim 1, wherein the processing node and the authority service node are part of a cloud-based security system.

15. The system of claim 6, wherein the user communicates with the at least one processing node and logs into the cloud-based system through the processing node in communication with the authority service node; and wherein, once logged in, the processing node provides access to the network to the user through the cryptographic challenge response mechanism.

16. The system of claim 6, wherein the processing node is configured to monitor all traffic between the particular user and the requested domain via a tunnel, a transparent proxy, a forward proxy, or redirection to the processing node.

17. The system of claim 6, wherein the processing node and the authority service node are part of a cloud-based security system.

* * * * *